(12) United States Patent
Grant et al.

(10) Patent No.: US 12,202,550 B2
(45) Date of Patent: Jan. 21, 2025

(54) AXLE MOUNTED TIRE SHRAPNEL CONTAINMENT SHIELD

(71) Applicant: Derek Grant, Seguin, TX (US)

(72) Inventors: Derek Grant, Seguin, TX (US); Mark Lipsey, Nixon, TX (US)

(73) Assignee: Derek Grant, Seguin, TX (US)

( * ) Notice: Subject to any disclaimer, the term of this patent is extended or adjusted under 35 U.S.C. 154(b) by 399 days.

(21) Appl. No.: 17/663,382

(22) Filed: May 13, 2022

(65) Prior Publication Data

US 2022/0363319 A1    Nov. 17, 2022

Related U.S. Application Data

(60) Provisional application No. 63/201,837, filed on May 14, 2021.

(51) Int. Cl.
| | | |
|---|---|---|
| *B62D 25/18* | (2006.01) | |
| *B60B 7/04* | (2006.01) | |
| *B62D 25/16* | (2006.01) | |

(52) U.S. Cl.
CPC .............. *B62D 25/182* (2013.01); *B60B 7/04* (2013.01); *B62D 25/163* (2013.01)

(58) Field of Classification Search
CPC .... B62D 25/182; B62D 25/163; B62D 25/16; B62D 25/165; B62D 25/166; B62D 25/186; B62D 25/188; B60B 7/04
See application file for complete search history.

(56) References Cited

U.S. PATENT DOCUMENTS

| | | | | |
|---|---|---|---|---|
| 460,053 | A * | 9/1891 | Paine ................... | B62D 25/186 |
| | | | | 280/157 |
| 1,026,293 | A * | 5/1912 | Adix ...................... | B60R 19/54 |
| | | | | 280/160 |
| 1,405,216 | A * | 1/1922 | Holmes ................. | B62D 49/00 |
| | | | | 280/848 |
| 1,613,443 | A * | 1/1927 | Amato .................. | B62D 25/186 |
| | | | | 280/157 |

(Continued)

FOREIGN PATENT DOCUMENTS

| | | | | |
|---|---|---|---|---|
| FR | 2764859 | A1 * | 12/1998 | .......... B62D 25/186 |
| FR | 2847876 | A1 * | 6/2004 | .......... B62D 25/186 |

(Continued)

OTHER PUBLICATIONS

Big Iron Auctions, 1961 John Deere 3010 Narrow Front 2WD Tractor, accessed Aug. 23, 2024, www.bigiron.com/Lots/1961JohnDeere3010narrowfront2WDTractor.

(Continued)

*Primary Examiner* — Jacob B Meyer
(74) *Attorney, Agent, or Firm* — Thompson Patent Law Offices PC

(57) ABSTRACT

Apparatus and associated methods relate to a tire containment device securely mounted to an axle of a vehicle to contain shrapnel caused by a tire blowout. In an illustrative example, the tire containment device may include an axle bracket and a tire fender. The axle bracket, for example, may be mounted to an axle of the vehicle. The tire fender may, for example, have a substantially continuous containment cavity. In some examples, when the tire fender is coupled to a vehicle axle by the axle bracket, the containment cavity may extend over at least a top and an exterior face of an upper third of a diameter of a tire. For example, the containment cavity may substantially intercept shrapnel from failure of the tire before it reaches a body of the vehicle. Various embodiments may advantageously reduce damage to a body of the vehicle during a tire blowout.

16 Claims, 8 Drawing Sheets

(56) References Cited

U.S. PATENT DOCUMENTS

| | | | | |
|---|---|---|---|---|
| 1,855,761 | A * | 4/1932 | Hughes | B62D 25/16 280/847 |
| 2,774,610 | A * | 12/1956 | Ratcliffe | B62D 25/188 280/847 |
| 3,784,226 | A * | 1/1974 | Wilfert | B62D 25/186 280/157 |
| 4,421,333 | A | 12/1983 | Van Dyke | |
| 4,986,571 | A | 1/1991 | Godbersen | |
| 5,511,808 | A * | 4/1996 | Rowland | B62D 25/163 280/847 |
| 5,816,616 | A | 10/1998 | Boyd | |
| 5,836,399 | A * | 11/1998 | Maiwald | B62D 25/186 280/157 |
| 6,007,102 | A * | 12/1999 | Helmus | B62D 25/182 280/847 |
| 6,336,677 | B2 | 1/2002 | Scott | |
| 6,367,841 | B1 * | 4/2002 | Matthew | B62D 25/168 280/847 |
| 6,592,147 | B2 | 7/2003 | Lambertus | |
| 6,749,205 | B2 | 6/2004 | Briscese | |
| 6,893,048 | B2 * | 5/2005 | Rush | B62D 25/163 280/154 |
| 7,946,646 | B2 * | 5/2011 | Kim | B62D 25/16 296/198 |
| 8,066,304 | B2 * | 11/2011 | Ulgen | B62D 25/182 280/847 |
| 8,814,253 | B1 * | 8/2014 | Butler | B62D 25/163 296/180.4 |
| 8,882,121 | B2 * | 11/2014 | Ducroquet | B62D 25/168 280/157 |
| 9,193,392 | B2 * | 11/2015 | Lodi | B62D 25/00 |
| 9,545,955 | B2 * | 1/2017 | Xu | B62D 25/186 |
| 9,603,305 | B2 * | 3/2017 | Rau | B62D 25/16 |
| 9,622,414 | B2 * | 4/2017 | Snyder | B62D 25/182 |
| 10,787,205 | B2 * | 9/2020 | Driant | B62D 25/16 |
| 11,352,068 | B2 * | 6/2022 | Ballarin | B62D 35/00 |
| 11,453,444 | B2 * | 9/2022 | Bowen | B62D 25/18 |
| 2006/0012145 | A1 | 1/2006 | Gardner | |
| 2006/0157952 | A1 * | 7/2006 | Bonnaud | B62D 29/043 280/160 |
| 2007/0182151 | A1 | 8/2007 | Aulabaugh | |
| 2011/0080019 | A1 * | 4/2011 | Castillo | B62D 25/16 296/180.1 |
| 2011/0304129 | A1 * | 12/2011 | Owens | B62D 25/16 280/849 |
| 2015/0274213 | A1 * | 10/2015 | Rudwal | B62J 15/02 280/154 |
| 2016/0288843 | A1 * | 10/2016 | Fujimoto | B60D 1/02 |
| 2017/0334486 | A1 * | 11/2017 | Plebani | B62D 25/168 |
| 2022/0177043 | A1 | 6/2022 | Bowen et al. | |
| 2022/0363319 | A1 * | 11/2022 | Grant | B60B 7/061 |
| 2024/0270322 | A1 * | 8/2024 | Bowen | B62D 25/163 |

FOREIGN PATENT DOCUMENTS

| | | | |
|---|---|---|---|
| TR | 2021005361 A2 | 10/2022 | |
| WO | WO-2016197161 A1 * | 12/2016 | |

OTHER PUBLICATIONS

Deere & Company, Adjusting the Fixed Fenders (Older Version), accessed Aug. 23, 2024, www. manuals.deere.com/omview/OMLG100524_19/OU12401,00013AB_19_20060307.html.

Deere & Company, Adjusting the Fixed Fenders, accessed Aug. 21, 2024, www.manuals.deere.com/omview/OMAL171426_19/OULXE59,0010849_19_20051221.html.

Deere & Company, Technical Information Store, accessed Aug. 23, 2024, https://techpubs.deere.com/en-US/Search/Equipment.

Harbor Freight, HAUL-MASTER 1195 lb. Capacity, 48-5/8 in. x 96-1/4 in. Heavy Duty Folding Trailer, accessed Aug. 20, 2024, www.harborfreight.com/1195-lb-capacity-48-58-in-x-96-14-in-heavy-duty-folding-trailer-62666.html?utm_source=google&utm_medium=cpc&utm_campaign=12192885310&campaignid=12192885310&utm_content=161913051106&adsetid=161913051106&product=62666&store=167&gad_source=1.

Hartzell Propeller Inc., Service Letter Transmittal Sheet HC-SL-30-259, Mar. 9, 2022, 12 pages.

John Deere, 4620 Tractor, Feb. 28, 1996, 565 pages.

John Deere, Operation, 2024 Copyright, 23 pages.

Minimizer, Minimizer Lift Axle Bracket, accessed Aug. 23, 2024, www.web.archive.org/web/20160718054631/https://www.minimizer.com/product/minimizer-lift-axle-bracket/.

TractorData, John Deere 3010, New Generation Series Row-Crop tractor, accessed Aug. 23, 2024, https://www.tractordata.com/farm-tractors/000/0/6/60-john-deere-3010.html.

Yesterday's Tractor Co., Jon Deere 3010 Fender Bracket, Used, 2 pages, www.yesterdaystractors.com/.

Action RV Service Center, "Fifth Wheel Tire Blow-Fender Damage—Action RV Conroe." https://www.actionrvconroetexas.com/client-fw-blowout.php (accessed Mar. 24, 2022).

Donald, S., "Review of Keystone Tandem Fender Skirt FS2293," IconDirect.com, Jun. 26, 2019. https://www.icondirect.com/keystone-tandem-fender-skirt-fs2293/ (accessed Mar. 25, 2022).

DYNABRADE. "Wheel Guard." Grainger. Accessed Mar. 24, 2022. https://www.grainger.com/product/DYNABRADE-Wheel-Guard-22GM80.

Grant Z. "Reproduction 1941 Fender Skirts." Antique Automobile Club of America—Discussion Forums, Sep. 4, 2019. https://forums.aaca.org/topic/332926-reproduction-1941-fender-skirts/.

Makita, "Wheel Guard, 4 1/2 in For Maximum Wheel Diameter, for Use With Makita Angle Grinders," Grainger.com, accessed Mar. 24, 2022, https://www.grainger.com/product/MAKITA-Wheel-Guard-780AW2.

Marble, R., "Can you 'contain' a tire failure ?," Aug. 2, 2016, RV Tire Safety with Roger Marble, accessed May 13, 2021, https://www.rvtiresafety.net/2016/08/can-you-contain-tire-failure.html.

Marble, R., "Contain tire Blowout?," RV Tire Safety with Roger Marble, Apr. 24, 2020. https://www.rvtiresafety.net/2020/04/contain-tire-blowout.html (accessed May 13, 2021).

ronusa.com, "How to Easily Replace Your RV Fender Skirts!," Pro Product Review, May 19, 2020. https://ronusa.blog/how-to-easily-replace-your-rv-fender-skirts/ (accessed Mar. 24, 2022).

South-Dakota-Antiques. "1951 1952 Chevrolet Car Accessory Fender Skirts Original Sedan Coupe Convertible." eBay. Accessed Mar. 25, 2022. https://www.ebay.com/itm/363542405480.

"RV-De-Fender," May 5, 2021. iPhone search.

RV-De-Fender, Trailer Safety Technologies, "RV-De-Fender," May 5, 2021, accessed May 13, 2021, iPhone search.

RV-De-Fender, Trailer Safety Technologies. "RV-De-Fender Search Listing." Facebook, Jan. 30, 2021. https://www.facebook.com/trailersafetytechnologies/.

Hartzell Propeller, Inc. Service Letter, dated Mar. 9, 2022, 12 pages.

Minimizer, B-Short Lift AX, retrieved from the internet, https://www.minimizer.com/wp-content/uploads/2018/01/BSHORTLIFTAX-diagram.pdf.

Minimizer, The Minimizer Advantage: 2016 Catalog, 108 pages.

* cited by examiner

AXLE MOUNTED TIRE SHRAPNEL CONTAINMENT SHIELD

CROSS-REFERENCE TO RELATED APPLICATIONS

This application claims the benefit of U.S. Provisional Application Ser. No. 63/201,837, titled "AXLE MOUNTED TIRE SHRAPNEL CONTAINMENT SHIELD," filed by Derek Grant, et al., on May 14, 2021.

This application incorporates the entire contents of the foregoing application(s) herein by reference.

TECHNICAL FIELD

Various embodiments relate generally to vehicle tire blowout shielding.

BACKGROUND

Tires are used to improve traction on a ground surface. Most tires, for example, are pneumatically inflated with compressed air. For example, pneumatic tires may provide a flexible cushion that absorbs shock as the tire rolls over rough features. Pneumatic tires may, for example, be made with synthetic rubber, natural rubber, fabric, and wire, along with other chemical compounds. A tire body provides containment for a quantity of compressed air. Before rubber was developed, the first versions of tires were simply bands of metal fitted around wooden wheels to prevent wear and tear. Early rubber tires were solid (not pneumatic). Pneumatic tires are used on many types of vehicles, including cars, bicycles, motorcycles, buses, trucks, heavy equipment, and aircraft.

A blowout is a rapid, explosive loss of inflation pressure of a pneumatic tire. In some examples, a blowout is caused by a tire encountering an object that cuts or tears the structural components of the tire to the point where the structure is incapable of containing the compressed air. In some examples, the escaping air may cause further and additional tear through the tire structure. Tire blowouts have been a concern since the dawn of the motoring age. Tire blowouts, especially at high speeds, may cause accidents due to loss of control within a vehicle. These accidents may include spin-outs and/or rollover of the vehicle. Sometimes the accident may cause a head-on collision. In some cases, debris from a tire blowout may damage a body of the vehicle.

SUMMARY

Apparatus and associated methods relate to a tire containment device securely mounted to an axle of a vehicle to contain shrapnel caused by a tire blowout. In an illustrative example, the tire containment device may include an axle bracket and a tire fender. The axle bracket, for example, may be mounted to an axle of the vehicle. The tire fender may, for example, have a substantially continuous containment cavity. In some examples, when the tire fender is coupled to a vehicle axle by the axle bracket, the containment cavity may extend over at least a top and an exterior face of an upper third of a diameter of a tire. For example, the containment cavity may substantially intercept shrapnel from failure of the tire before it reaches a body of the vehicle. Various embodiments may advantageously reduce damage to a body of the vehicle during a tire blowout.

Various embodiments may achieve one or more advantages. For example, some embodiments may include releasably coupled front panel to advantageously allow for easy access and maintenance of a contained tire. Some embodiments may, for example, include brace element to advantageously strengthen the axle bracket. For example, some embodiments may include a tread cover having multiple fastening tabs to advantageously provide tensile strength to contain the shrapnel at a tire blowout.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an exemplary tire containment device is introduced with reference to FIG. 1. Second, that introduction leads into a description with reference to FIGS. 2-5D of some exemplary embodiments of the exemplary tire containment device. Third, with reference to FIGS. 6-7, the discussion turns to features and embodiments for reducing damage from a blowout using the exemplary tire containment device. Finally, the document discusses further embodiments, exemplary applications and aspects relating to additional safety features of the exemplary tire containment device.

Figure 1:
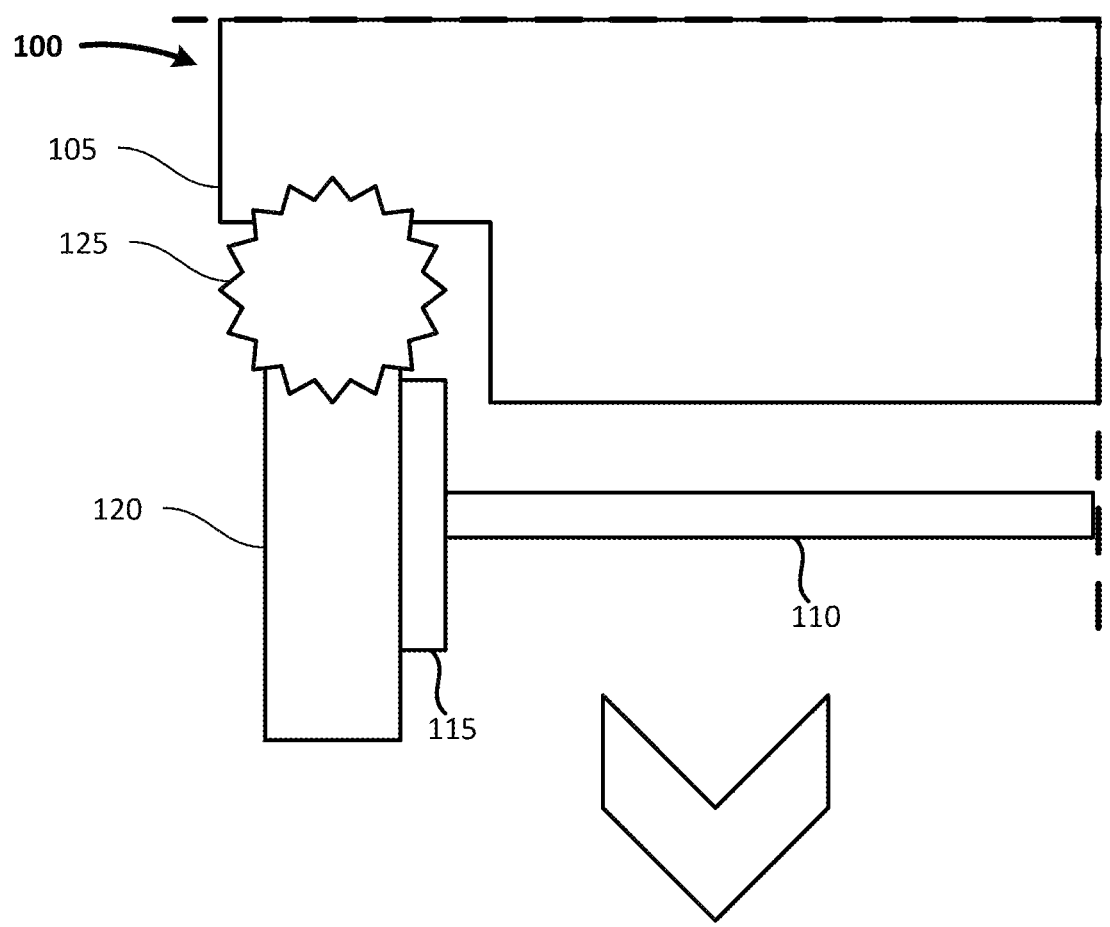
FIG. 1 depicts an exemplary tire containment device (TCD) employed in an illustrative use-case scenario on a travel trailer.
Figure 1:
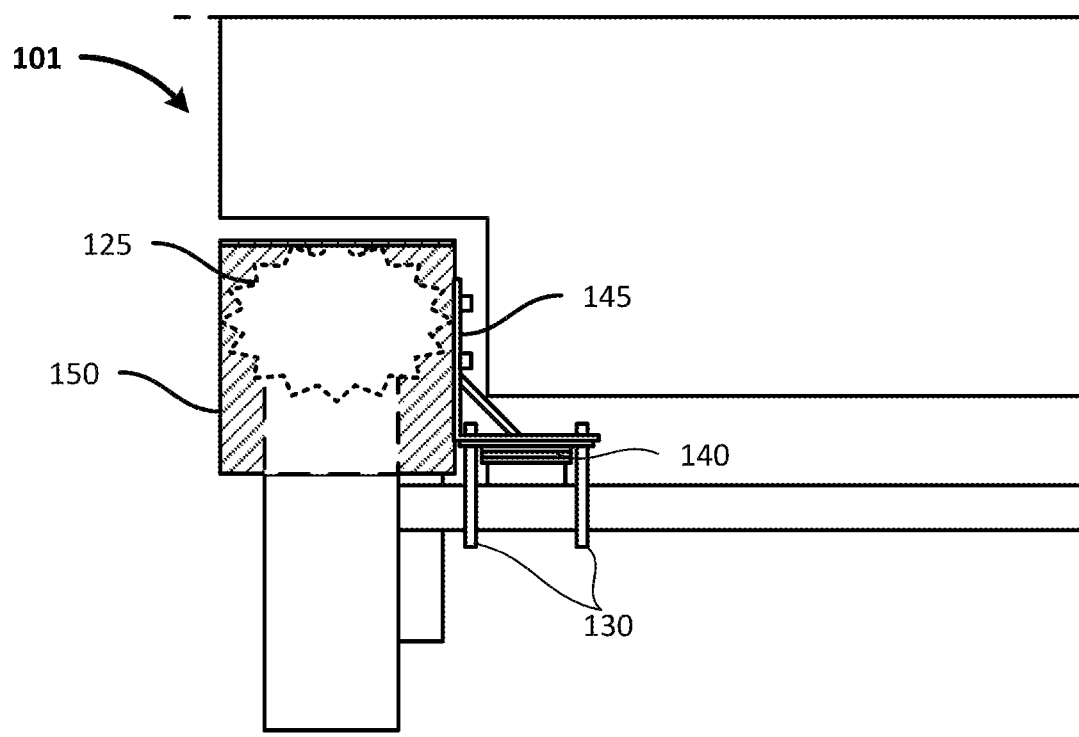

FIG. 1 depicts an exemplary tire containment device (TCD) employed in an illustrative use-case scenario on a vehicle (e.g., a travel trailer). In a depicted exemplary original equipment manufacturer (OEM) configuration 100, a body 105 of, for example, a travel trailer is provided. The body 105 may, by way of example and not limitation, be made of fiberglass, wood, metal (e.g., sheeting), plastic, or some combination thereof. The body 105 may, for example, be mounted (actual connection not shown) to an axle 110. The axle 110 is provided with a hub 115 to which is mounted a wheel (not shown) with a tire 120.

As depicted, the tire 120 is undergoing a blowout. In a blowout 125, tire shrapnel may impact the body 105. The tire shrapnel may, by way of example and not limitation, separate completely from the tire 120 and fly onto the body 105, may remain connected to the tire 120 and be slung against the body 105 while the trailer is still in motion, or some combination thereof. For example, the blowout 125 may occur while the trailer is traveling down a road at high speeds (e.g., 10, 20, 30, 40, 50, 60, 70, 80, or more miles per hour). Accordingly, the tire shrapnel may, sometimes repeatedly, impact the body 105 at high speeds. The impact may cause damage (e.g., breaking, tearing, bending) of the body 105, or one or more components thereof. The impact may, by way of example and not limitation, damage and/or destroy a fender, wall, underbody, electrical components, trailer slide-out components, or some combination thereof.

In a depicted armored configuration 101, the axle 110 is coupled, by U-bolts 130 and a leaf spring stack 140, to a TCD mounting bracket 145. The leaf spring stack 140 may, for example, include a stack of elastic materials adjusting a mounting position between the TCD mounting bracket 145 and the axle 110. The TCD mounting bracket 145 is coupled to a TCD shroud 150 such that the TCD shroud is disposed over the tire 120. As shown, the shroud 150 contains the tire shrapnel caused by the blowout 125 of the tire 120. In some implementations, other mounting modules for coupling the shroud to a vehicle may also be used. For example, the mounting modules may be mounted to the body, directly to the chassis, or other parts of the travel trailer. Accordingly, for example, the TCD may advantageously shield the body 105 from damage by the blowout 125. The TCD may, for example, advantageously eliminate or reduce damage to the trailer body 105 as a result of the blowout 125 of the tire 120.

Figure 2:
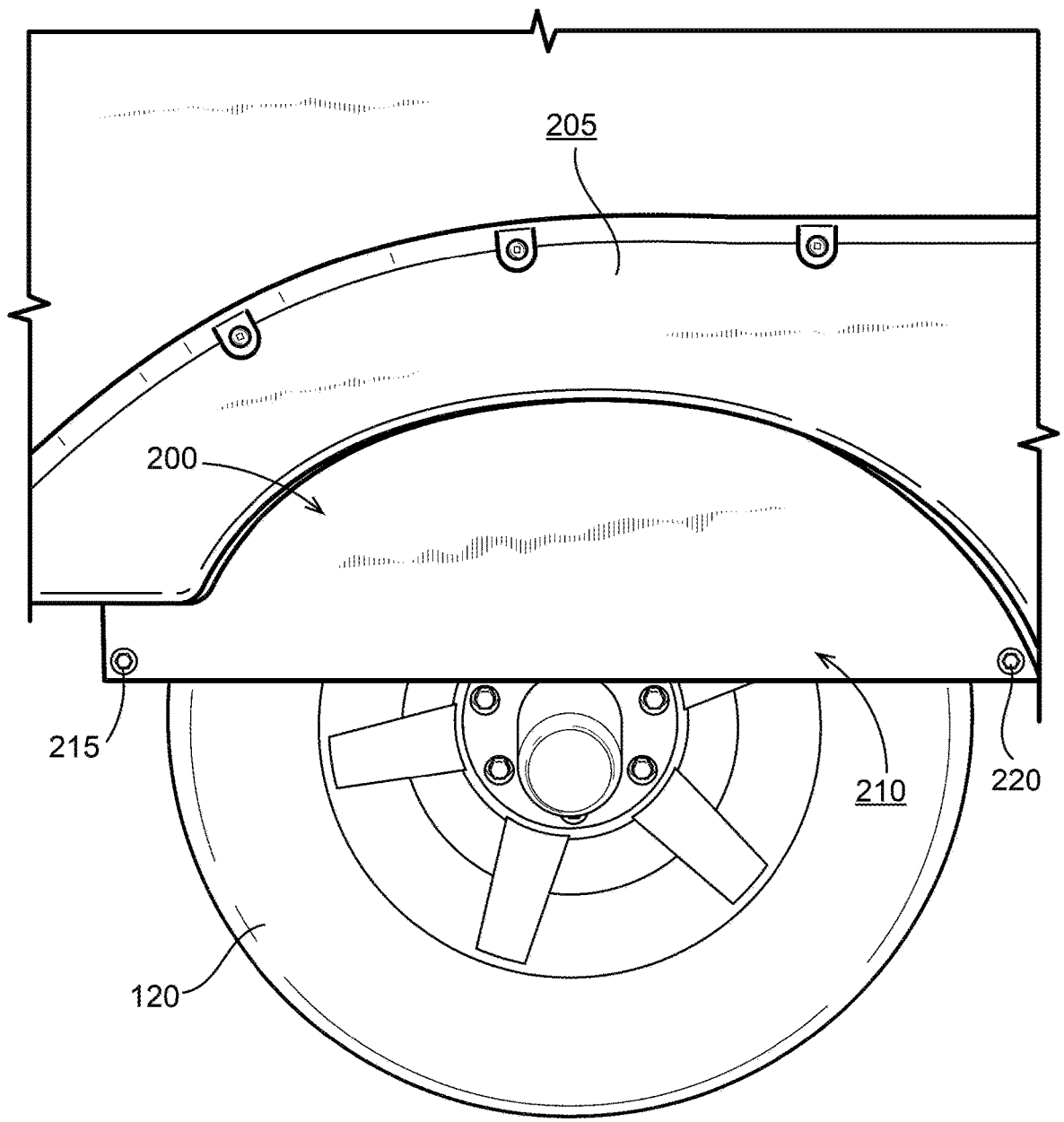
FIG. 2 depicts a front view of an exemplary TCD mounted on an illustrative travel trailer.

FIG. 2 depicts a front view of an exemplary TCD 200 mounted on an illustrative travel trailer. As depicted, the TCD 200 is mounted to the trailer underneath the existing body structure. Accordingly, a user may advantageously retain the existing body styling. The TCD 200 may, for example, be colored (e.g., painted, coated) and/or styled (e.g., shaped, oriented, positioned) to aesthetically blend in, complement, and/or match the trailer's existing body. As shown, the TCD 200 has a matching color with an OEM body fender 205. In various embodiments, the TCD 200 may be at least partially concealed as depicted. In some implementations, the TCD 200 may be substantially completely concealed, for example, by the existing body fender 205.

In some implementations, the exemplary TCD 200 includes a removable front panel 210. The front panel 210 may, for example, be releasably coupled to other parts of the shroud 150 (FIG. 1) by one or more releasable coupling mechanisms 215, 220. For example, the front panel 210 may be coupled to the other parts of the shroud 150. The front panel 210 may be coupled to the shroud 150 by, for example, bolts, screws, cams, hooks, and/or other fasteners. Accordingly, a user may advantageously easily access the tire 120 such as, by way of example and not limitation, for replacement, repair, and/or maintenance.

In various implementations, the front panel 210 and the other part(s) of the shroud 150 may form a substantially continuous containment cavity to contain an upper portion of the tire 120. For example, the continuous containment cavity may include only apertures with diameter less than 1 inch. Accordingly, in some examples, when the TCD 200 is coupled to the axle 110 by the TCD mounting bracket 145, the containment cavity may extend over at least a top and exterior face of an upper portion (e.g., an upper third) of the tire 120 such that the containment cavity may intercepts shrapnel from the blowout 125. For example, the containment cavity may advantageously reduce impact caused by the shrapnel at the body 105.

Figure 3:
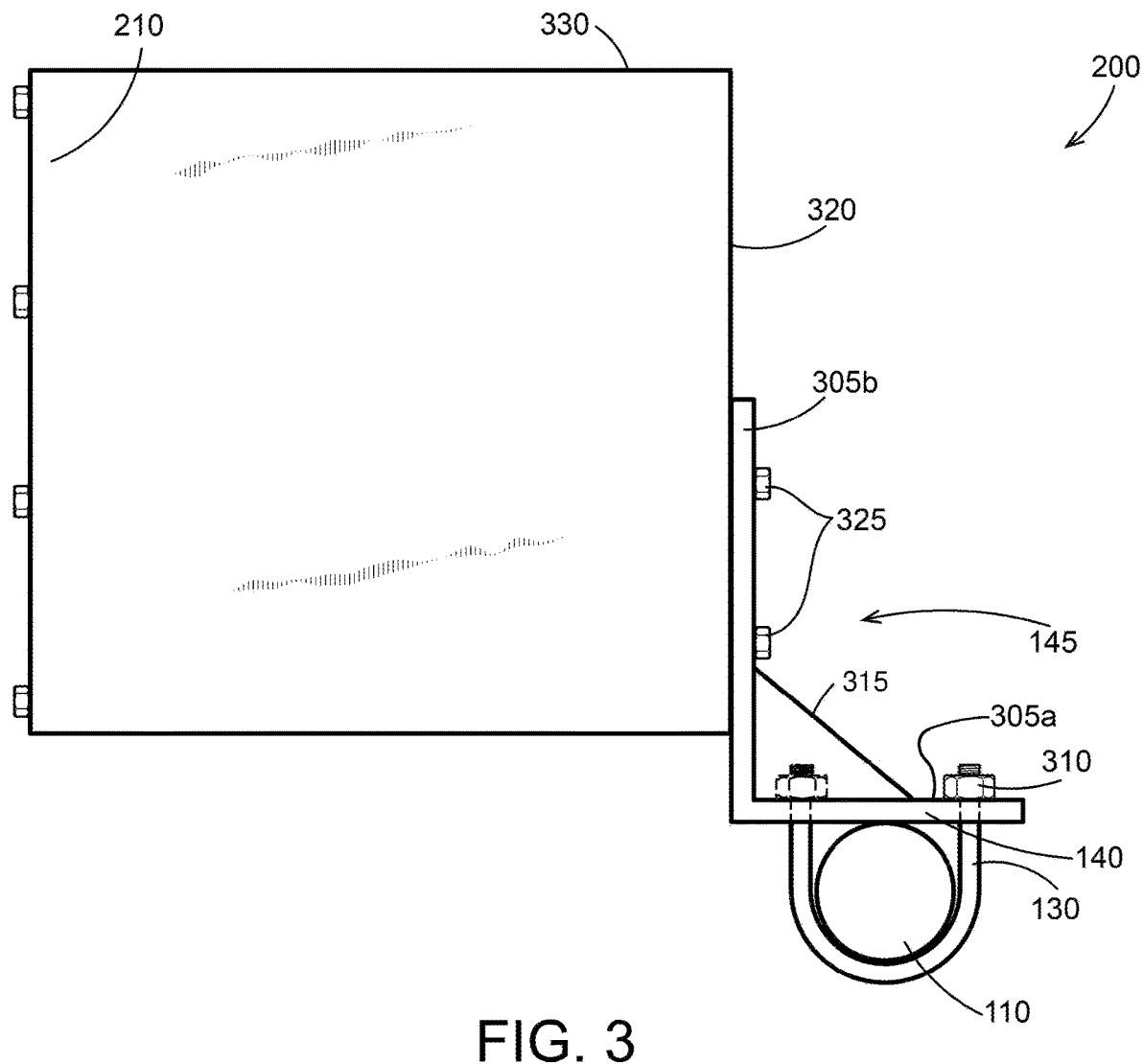
FIG. 3 depicts a side view of an exemplary TCD.

FIG. 3 depicts a side view of an exemplary TCD 200. For example, a front view of the TCD 200 may be described with reference to FIG. 2. In this example, the TCD 200 includes the TCD mounting bracket 145. The TCD mounting bracket 145 is provided with an axle mount portion 305a and a shroud mount portion 305b. In this example, the axle mount portion 305a couples to the leaf spring stack 140. As shown, the axle mount portion 305a is coupled over a top of the leaf spring stack 140 by the U-bolt 130. The U-bolt 130 couples the leaf springs stack 140 to the axle 110. Fasteners 310 (e.g., nuts and/or washers) are used to secure the axle mount portion 305a against the leaf spring stack 140. For example, the TCD mounting bracket 145 may be releasably secured to the axle 110 by the fasteners 310.

The shroud mount portion 305b, as shown, is attached the axle mount portion 305a. In some implementations, the shroud mount portion 305b may be permanently (e.g., welded) coupled to the axle mount portion 305a. In some implementations, the shroud mount portion 305a may be continuously and/or unitarily formed with the axle mount portion 305a. As depicted, the TCD mounting bracket 145 is provided with multiple bracing elements 315 (e.g., struts). The bracing elements 315 may, for example, connect the axle mount portion 305a to the shroud mount portion 305b. The bracing elements 315 may, for example, increase bending strength to advantageously maintain a predetermined orientation between the axle mount portion 305a and the shroud mount portion 305b. In various embodiments, one or more of the bracing elements 315 may be, for example, unitarily formed with a single material, releasably coupled to (e.g., bolted, screwed, interlockingly assembled), permanently coupled to (e.g., riveted, welded), or some combination thereof, at least one of the axle mount portion 305a and the shroud mount portion 305b.

The shroud mount portion 305b extends, in this example, upwards to receive the shroud of the TCD 200. As shown, the shroud mount portion 305b is releasably coupled to a back panel 320 of the shroud with fasteners 325. The shroud, in this example, further includes a fender arc 330. The fender arc 330 couples the front panel 210 on one edge and the back panel 320 on another edge. Accordingly, the fender arc 330, the front panel 210, and the back panel 320 may form a continuous cavity to advantageously contain shrapnel expelled from the blowout 125.

In some implementations, the front panel 210 and/or the back panel 320 may, for example, provide a tensile load path between two ends of the fender arc 330. For example, if shrapnel (e.g., connected to the tire such as a tire 'gator'—a strip of tire shrapnel attached to the tire and slinging out as the tire spins) strikes an end of the of the fender arc 330, a tensile force of the front panel 210 and/or the back panel 320 between the two ends may, for example, resist (e.g., prevent) bending out of the fender arc 330. Accordingly, the front panel 210 and/or the back panel 320 may, by way of example and not limitation, prevent the shrapnel from bending the fender arc 330 and then damaging the vehicle. In some implementations, the front panel 210 and the back panel 320 may, for example, cooperate to prevent bending of an end of the fender arc 330 at an uncoupled corner. As an illustrative example, if only the back panel 320 was provided, tire shrapnel may bend the front of an end of the fender arc 330, but providing the front panel 210 and the back panel 320 may advantageously transfer a load (e.g., by tension, compression, and/or shear) at least partially through the front panel 210 to an opposite end of the fender arc and/or to other portions of the fender arc 330, the back panel 320, the front panel 210, and/or the vehicle (e.g., the axle).

Figure 4:
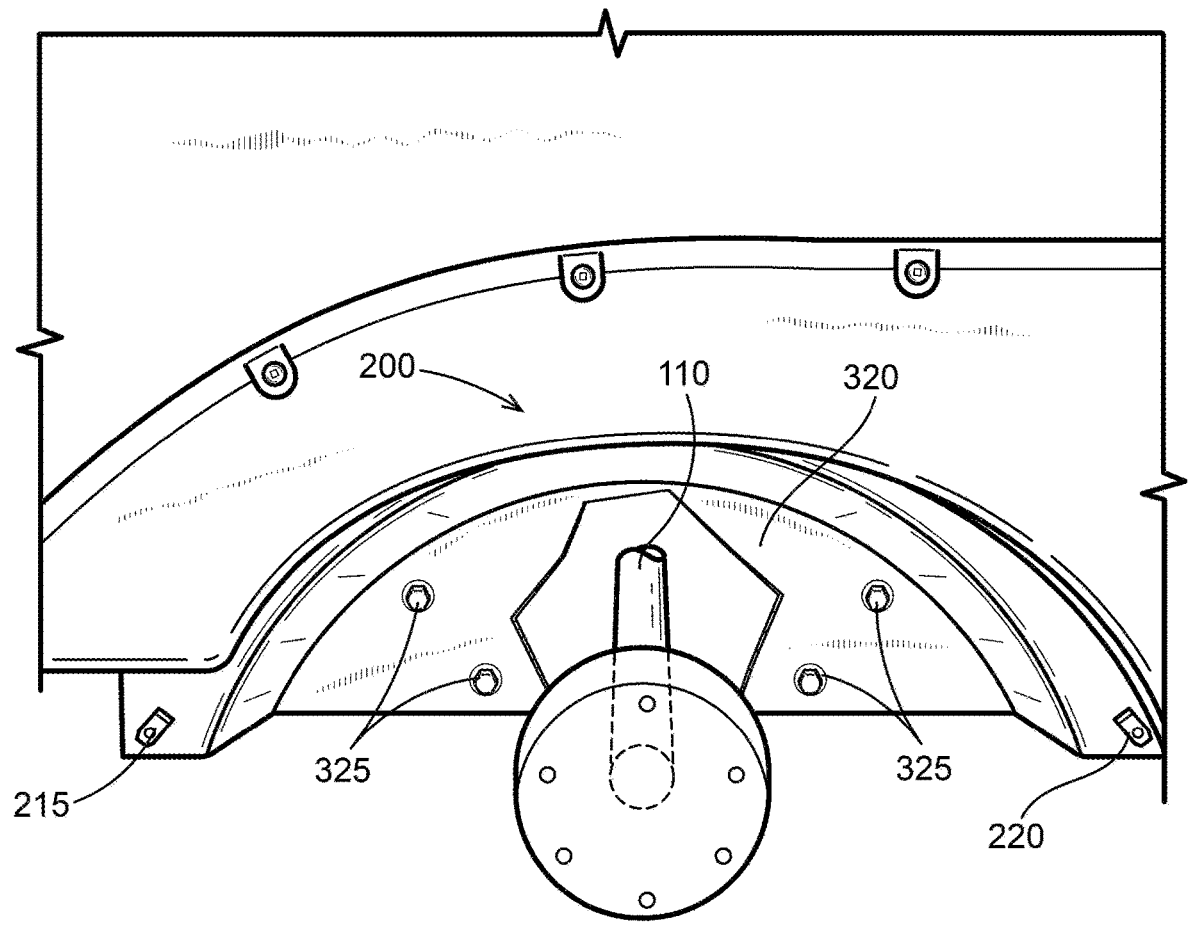
FIG. 4 depicts an exemplary TCD with a front access panel removed.

FIG. 4 depicts an exemplary TCD 200 with the front panel 210 removed. As shown, the back panel 320 is coupled to the shroud mount portion 305b using four fasteners 325. The fender arc 330, in this example, includes a curved surface along a longitudinal axis. In some implementations, a curvature of the fender arc 330 may be defined by an inner bounding diameter greater than the diameter of the tire 120.

In the lateral axis, in some implementations, the fender arc 330 may include a width greater than a width of the tire 120. In some implementations, the fender arc 330 may be wider than more than two tires so that the shroud 150 may contain more than one tire.

In some implementations, the fender arc 330 includes may be provided with tabs. For example, the tabs may be folded down from the fender arc to form fastening mechanisms to couple the front panel 210 and the back panel 320. As shown, the fender arc 330 includes coupling mechanisms 215, 220. As described with reference to FIG. 2, for examples, the coupling mechanisms 215, 220 may couple with the front panel 210 at a front perimeter. In some examples, the fender arc 330 may include the coupling mechanisms 215, 220 to couple the back panel at a back perimeter. In various implementations, the fender arc 330 may provide multiple coupling mechanisms at various points at the front perimeter and the back perimeter to provide a secure tensile force against debris from the blowout 125.

Figure 5A:
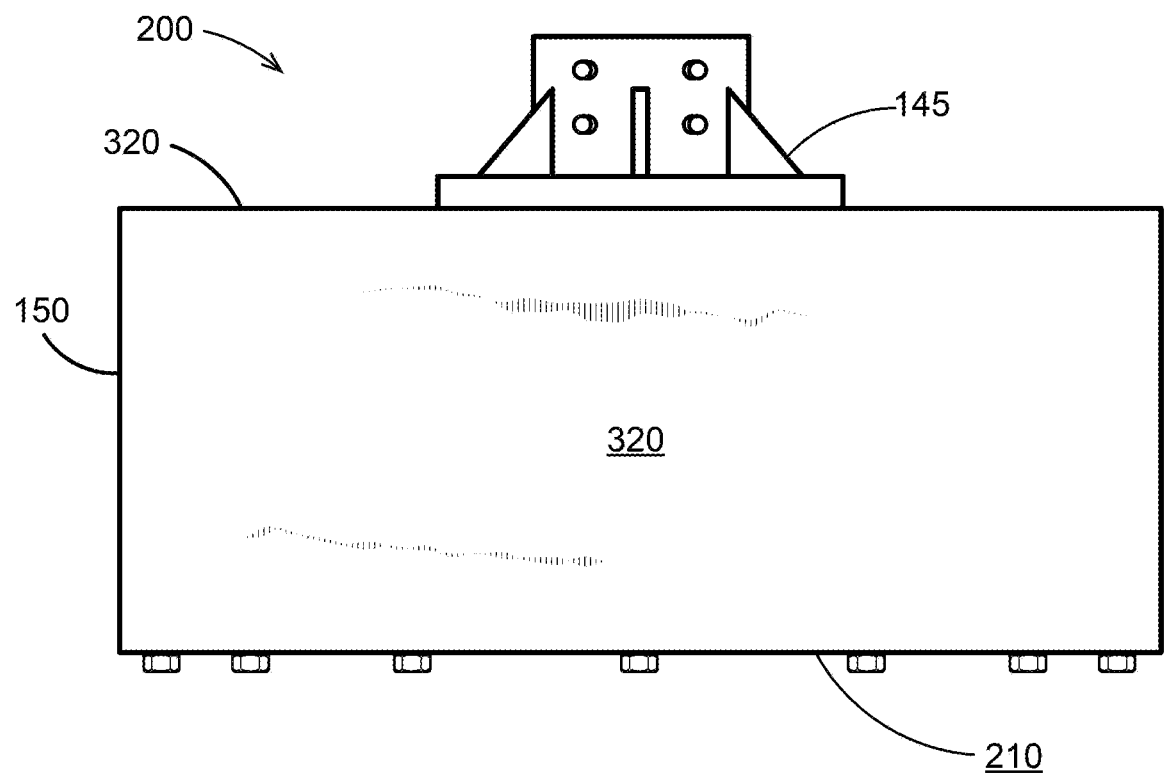
FIG. 5A depicts a top view of an exemplary TCD.
Figure 5B:
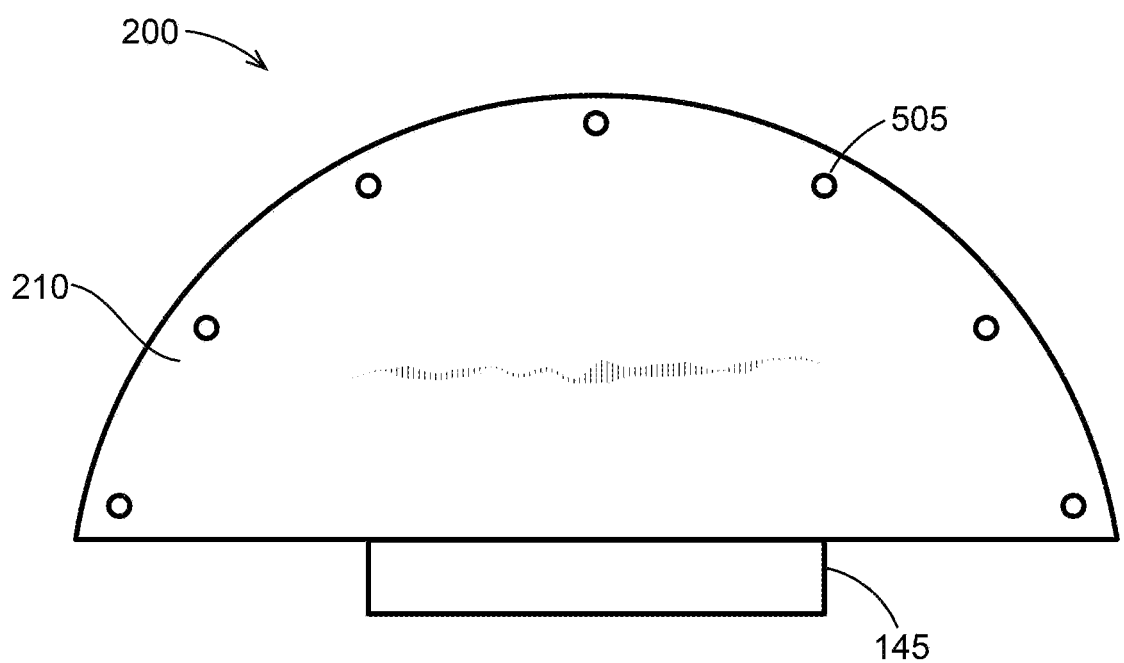
FIG. 5B depicts a front view of an exemplary TCD.
Figure 5C:
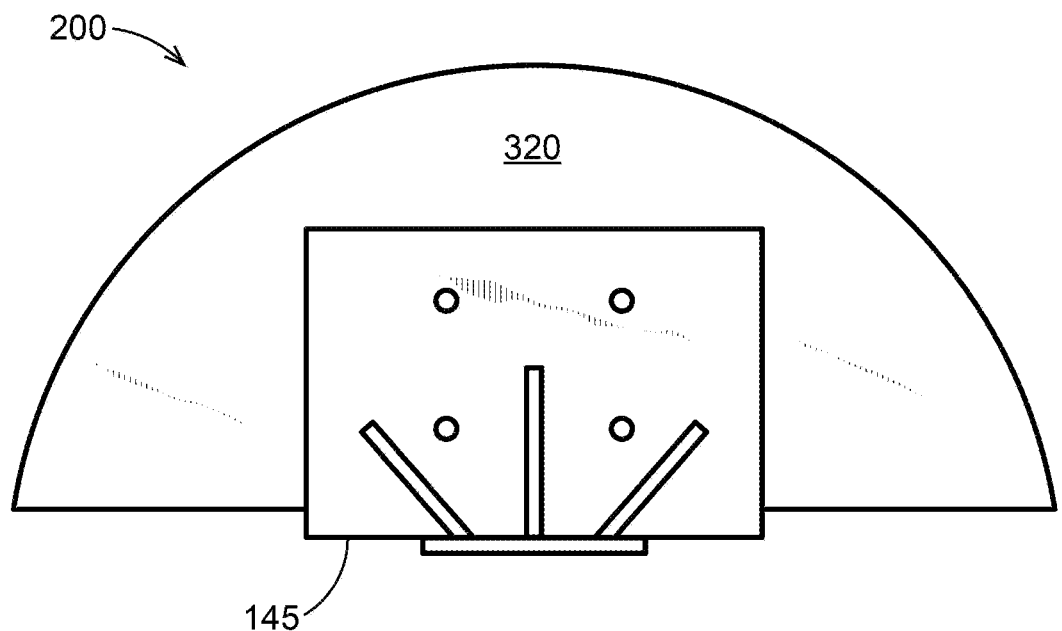
FIG. 5C depicts a rear view of an exemplary TCD.

FIG. 5A depicts a top view of an exemplary TCD 200. FIG. 5B depicts a front view of an exemplary TCD 200. As shown, the front panel 210 includes multiple fastening mechanisms 505 to provide extra tensile strength for the TCD 200 against shrapnel from the blowout 125. FIG. 5C depicts a rear view of an exemplary TCD 200.

Figure 5D:
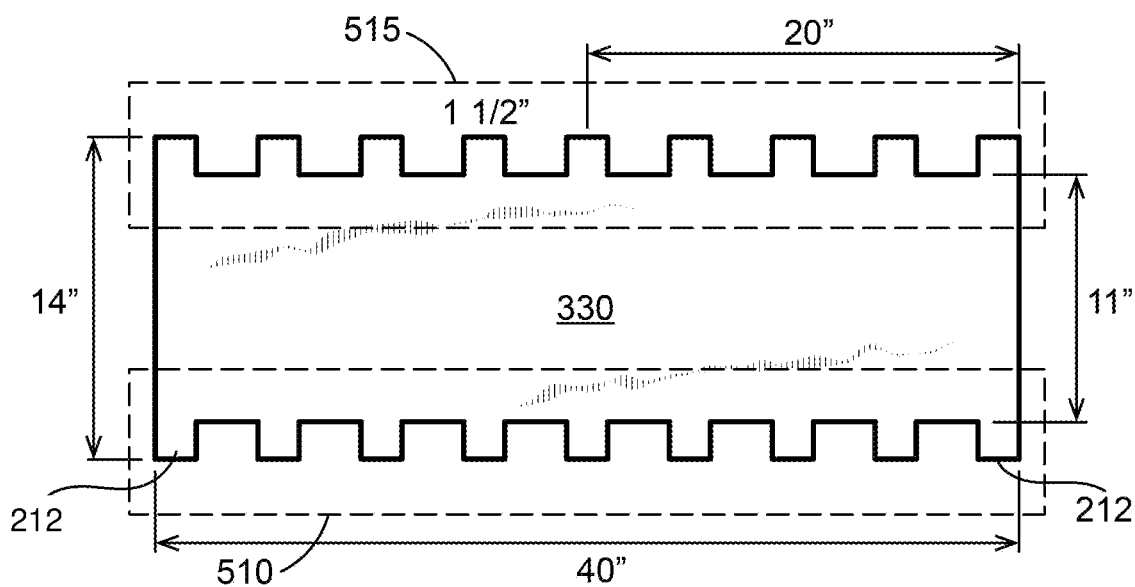
FIG. 5D depicts a top view of an exemplary fender arc.

FIG. 5D depicts a top view of an exemplary fender arc 330. Dimensions as shown are for illustrative purpose only. Other dimensions may be possible, in some implementations. The fender arc 330, as shown, include tab portions 510, 515 at a front edge and a back edge, respectively, of the fender arc 330. The tab portions 510, 515 each include multiple tabs 212. For example, the fender arc 330 may couple, using the tabs 212 (e.g., folded downward), to the front panel 210 (e.g., at the multiple fastening mechanisms 505 as described with reference to FIG. 5B). For example, the fender arc 330 may similarly couple, using the tabs 212, to the back panel 320.

In some implementations, the front panel 210, the back panel 320, and the fender arc 330 may be cut into shape from a 4 ft×8 ft sheet of material (e.g., 1/16" plate steel). Dimensions are illustrative. Other dimensions, configurations, and/or ratios are contemplated in various embodiments.

Figure 6:
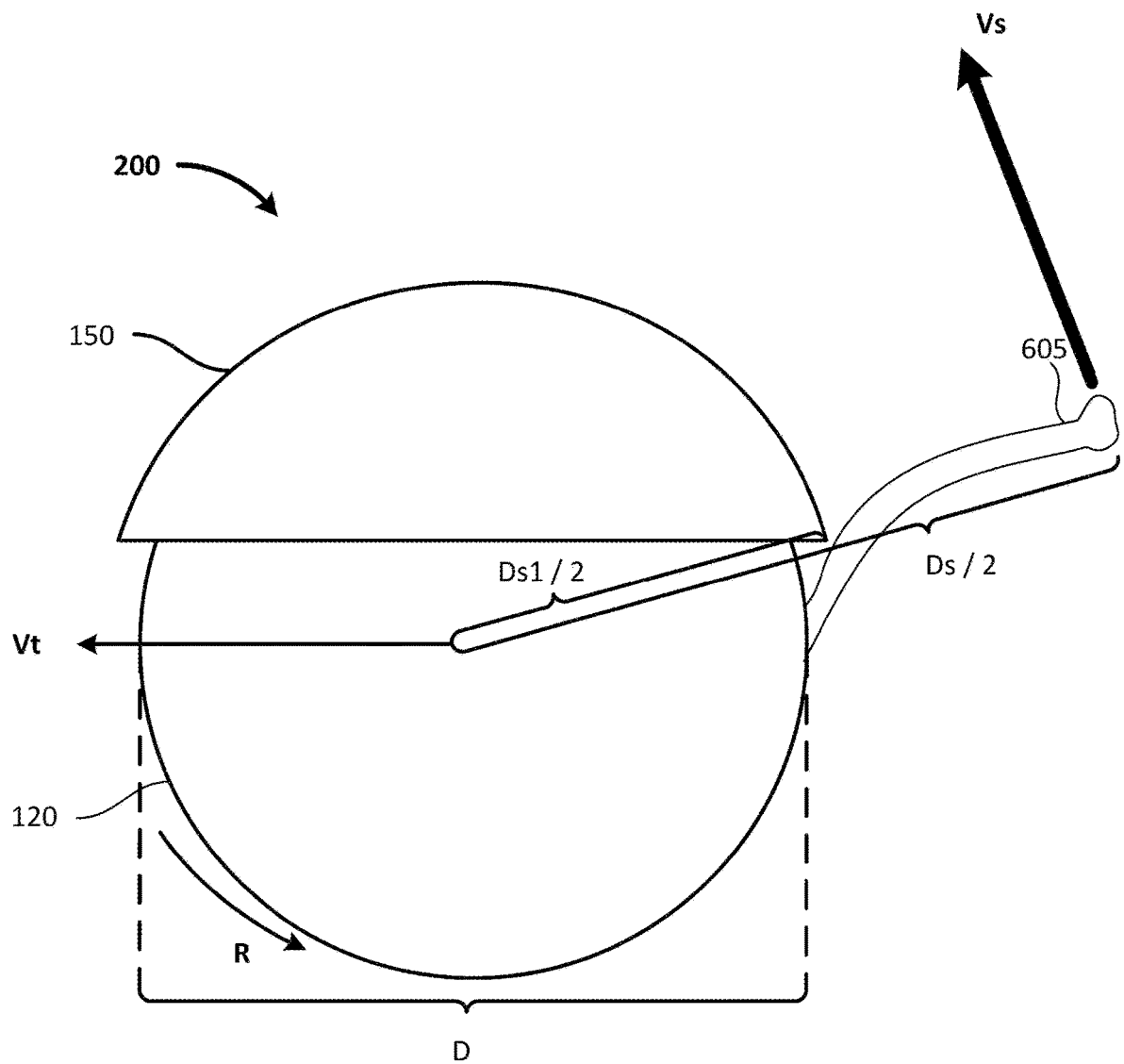
FIG. 6 and FIG. 7 an exemplary TCD having a blowout tire with a piece of shrapnel in two illustrative use-case scenarios.
Figure 7:
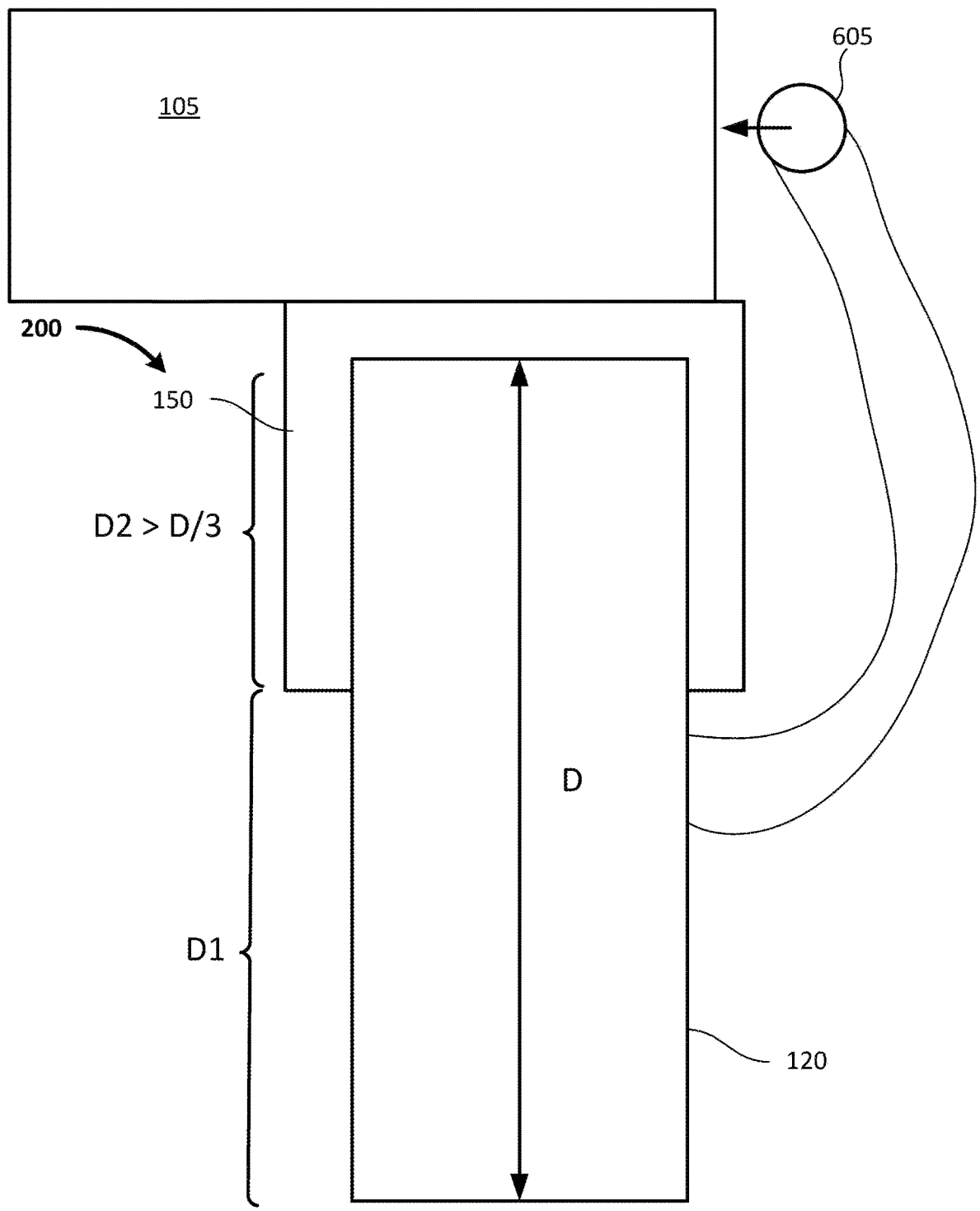

FIG. 6 and FIG. 7 depict an exemplary TCD 200 having a blowout tire with a piece of shrapnel 605 in two illustrative use-case scenarios. FIG. 6 depicts an exemplary blowout scenario with a tire and a piece of shrapnel. In various examples, the shrapnel 605 may cause severe damage to the body 105 due at least in part to amplified linear velocity. For example, as depicted, the tire 120 (e.g., of a travel trailer) is traveling at a forward linear velocity of Vt. For a given diameter D of the tire 120, the rotational speed (e.g., rotations/second) of the tire 120 may be given by:

$$R = v_t / \pi \cdot D \quad \text{Equation 1:}$$

After the blowout 125, a piece of shrapnel 605, still attached to the tire 120, extends outwards from the tire 120 while the tire 120 is rotating. Accordingly, the shrapnel 605 may have an increased effective diameter of rotation (Ds) at a point of impact with the body 105. The linear velocity of the shrapnel (Vs) into the body 105 at the point of impact may be defined by:

$$v_s = \pi \cdot D_s \cdot R \quad \text{Equation 2:}$$

The enlarged diameter effectively amplifies the speed of impact of the shrapnel 605. For example, if the tire 120 diameter (D) is 16 inches, and the shrapnel extends 8 inches beyond the diameter of the tire 120 at the point of impact, then the effective diameter Ds of the shrapnel 605 is 16+8+8=32. Therefore, in this example:

$$D_s = 2 \cdot D \quad \text{Equation 3:}$$

Substituting Equation 3 and Equation 1 into Equation 2 gives:

$$v_s = \pi \cdot 2D \cdot R = \pi \cdot 2D \cdot R \frac{v_t}{\pi \cdot D} = 2 \cdot R \cdot v_t \quad \text{Equation 4}$$

If the shrapnel 605 has a mass m, and the body 105 completely stops the forward motion of the shrapnel 605 over a period of time t such that change in velocity (ΔV) is Vs and change in time (Δt) is t, the force applied to the body 105 by the shrapnel 605 (and vice versa) may be given by:

$$F = m \cdot a = m \cdot \frac{\Delta V}{\Delta t} = m \cdot \frac{v_s}{t} = m \cdot \frac{2Rv_t}{t} = m \cdot \frac{2v_t}{t} \frac{v_t}{\pi \cdot D} = m \cdot \frac{2v_t^2}{t\pi D} \quad \text{Equation 5}$$

Accordingly, if the m of the shrapnel 605 is ¼ pound (0.007 slug), the trailer is traveling (Vt) at 70 miles per hour (mph) (103 feet per second), and the time of deceleration t is 1 second, then the force (F) may be determined by substituting into Equation 5 using Equation 4:

$$F = 0.007 \text{ slug} \cdot \frac{2 \cdot 103 \text{ ft/sec}^2}{1 \text{ sec} \cdot \pi \cdot 1.33 \text{ ft}} \approx 36 \text{ pounds} \quad \text{Equation 6}$$

A one-pound piece of shrapnel 605 in the same scenario would strike with approximately 142 pounds. Accordingly, the shrapnel 605 may quickly damage and/or destroy the body 105. The TCD 200 may advantageously contain the shrapnel 605. As depicted, the shroud 150 of the TCD 200 may contain the shrapnel within a smaller diameter Ds1, thereby reducing the effective linear velocity of the shrapnel 605. Furthermore, the TCD 200 may absorb the force of impact (e.g., at a lower effective speed) such as, for example, before the shrapnel 605 strikes the body 105. Accordingly, the TCD 200 may advantageously prevent and/or reduce damage to the body 105 due to blowout of the tire 120.

FIG. 7 shows another exemplary blowout scenario with the tire 120 and the shrapnel 605. As shown, the shrapnel 605 is wrapping around the shroud 150 to impact the body 105. In this example, the TCD 200 includes the shroud 150 extending at least ⅓ of the way down an upper portion of the tire 120. For example, as shown, the tire 120 has a diameter D and the shroud 150 extends downwards to cover at least D/3 from a top surface of the tire 120.

As an illustrative example, without the shroud 150, a maximum effective diameter of rotation of the shrapnel 605 is D. With the shroud 150 installed, the maximum effective diameter of rotation of the shrapnel 605 is reduced to D1=D–D2. Accordingly, the TCD 200 may reduce damage to the body 105. In some implementations, the shroud 150 may be configured to cover, by way of example and not limitation, more than ¼ of an upper portion of the tire 120. Such implementation may, for example, substantially prevent the shrapnel 605 to wrap around to impact the body 105. In some implementations, the shroud 150 may be configured, for example, to cover at least ½ of an upper portion of the tire 120 (e.g., at least on an exterior side of the tire, such as facing outward from the vehicle). Such implementations may, for example, provide enhanced protection from shrapnel.

Although various embodiments have been described with reference to the figures, other embodiments are possible. For example, although an exemplary system has been described with reference to the figures, other implementations may be deployed in other industrial, scientific, medical, commercial, and/or residential applications.

In various embodiments, a TCD may, by way of example and not limitation, be configured for and/or coupled to a travel trailer, recreational vehicle, motor home, utility trailer, boat trailer, automobile, a device supplied with one or more rotating tire susceptible to blowout, or some combination thereof. In various embodiments, by way of example and not limitation, a TCD may be configured to shroud 1, 2, 3, or more tires. In various embodiment, by way of example and not limitation, 1, 2, 4, 6, or more TCDs may be installed on a single trailer. In various embodiments a TCD may be configured to couple to an axle configured as a leaf-spring mounted axle, a torsion axle, a spring-mounted axle, or some combination thereof.

In various embodiments one or more components may be separate components. In various embodiments multiple components may be releasably or permanently assembled, may be unitarily formed, may be made of a single material, or some combination thereof. For example, a mounting bracket may be fabricated (e.g., made of sheet material and assembled or unitarily formed from a single piece of material), cast, or some combination thereof. A shroud may, for example, be fabricated, cast, or some combination thereof. In various embodiments the shroud may, for example, be at least partially formed by cup-drawing of a single piece of material. In various embodiments the components may be provided individually, as an assembly, a kit, or some combination thereof. In various embodiments the shroud may, for example, be permanently coupled to (e.g., integrally formed with, assembled with) the bracket. In various embodiments the shroud and the bracket may be separate components.

In various embodiments at least some portion of the bracket, the shroud, or some combination thereof, may be constructed of steel, aluminum, titanium, other metal, ceramet, fiber-reinforced resin (e.g., carbon fiber, fiberglass), polymer, natural material (e.g., wood), or some combination thereof.

In an illustrative test, a TCD such as depicted in FIGS. 1-5D was mounted to an axle and ½ lb. of Tannerite-type explosive was detonated within the TCD to simulate a tire explosion. The TCD successfully contained the explosion such that damage above and surrounding the TCD was prevented. Without being bound by a particular theory, the front and back panels, for example, each applied a tensile force across a load path connecting the two ends of the fender arc (e.g., the load path having a distance less than an arc length of the fender, such as, as depicted, in a straight line between the two ends) such that was not bent outwards. In this test, the TCD was built out of ¹⁄₁₆" steel (mild steel, such as A40). The front panel was secured to the fender arc by 10 mm diameter bolts. The back panel was welded to the fender arc.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A tire shrapnel protection device comprising:
   an axle bracket;
   a front panel;
   a back panel; and,
   a tread cover having a width greater than a width of the tire and extending from a first edge to a second edge along a curvilinear path defined by an inner bounding diameter greater than a diameter of the tire,
   wherein:
      the front panel and the back panel are each releasably coupled to a corresponding edge of the tread cover at the first edge and at the second edge forming a tire fender of a substantially continuous containment cavity configured such that, when the substantially continuous containment cavity is coupled to a vehicle axle by the axle bracket, the substantially continuous containment cavity extends over at least a top and an exterior face of an upper third of a diameter of a tire such that the containment cavity intercepts shrapnel from failure of the tire before it reaches a body of the vehicle;
   wherein the front panel releasably couples to the tire fender through one or more tabs of the tread cover.

2. The tire shrapnel protection device of claim 1, further comprising:
   a bent bracket; and
   a plurality of height adjusting panels,
   wherein:
      the axle bracket is coupled on top of the vehicle axle by coupling to the bent bracket,
      the bent bracket circumscribes a bottom of the vehicle axle and couples to the axle bracket at the top of the vehicle axle, and
      the plurality of height adjusting panels are sandwiched between the axle and the axle bracket.

3. The tire shrapnel protection device of claim 2, wherein the bent bracket comprises a U-bolt.

4. The tire shrapnel protection device of claim 1, wherein the axle bracket comprises:
   a first mounting member mounted to the tire fender;
   a second mounting member mounted to the vehicle axle; and,
   a plurality of bracing elements connecting the first mounting member to the second mounting member such that, a predetermined angle is maintained between the first mounting member to the second mounting member.

5. The tire shrapnel protection device of claim 1, wherein the tread cover has a width greater than a total width of two tires.

6. The tire shrapnel protection device of claim 1, wherein the front panel, the back panel, and the tread cover are cut from a single four-foot by eight-foot sheet of material.

7. The tire shrapnel protection device of claim 1, wherein the front panel, the back panel, and the tread cover comprises plate steel at least one-sixteenth inch thick.

8. A tire shrapnel protection device comprising:
   an axle bracket; and,
   a tire fender having a substantially continuous containment cavity configured such that, when the tire fender is coupled to a vehicle axle by the axle bracket, the containment cavity extends over at least a top and an exterior face of an upper third of a diameter of a tire such that the containment cavity intercepts shrapnel from failure of the tire before it reaches a body vehicle;

wherein the tire fender comprising:

a tread cover having a width greater than a width of the tire and extending from a first edge to a second edge along a curvilinear path defined by an inner bounding diameter greater than the diameter of the tire;

a front panel releasably coupled to one or more tabs of the tread cover at a front perimeter thereof; and, a back panel coupled to the tread cover at a back perimeter, wherein the front panel and the back panel are each coupled to a corresponding face of the tread cover at the first edge and at the second edge such that, when the shrapnel impacts at least one of the first edge and the second edge, at least one of the front panel and the back panel apply a tensile force between the first edge and the second edge along a mechanical path having an effective diameter less than the tire diameter.

9. The tire shrapnel protection device of claim 8, wherein the tread cover has a width greater than a total width of two tires.

10. The tire shrapnel protection device of claim 8, wherein the substantially continuous containment cavity comprises apertures of less than 1 inch in diameter.

11. The tire shrapnel protection device of claim 8, further comprising:

a bent bracket; and a plurality of height adjusting panels, wherein:

the axle bracket is coupled on top of the vehicle axle by coupling to the bent bracket, the bent bracket circumscribes a bottom of the vehicle axle and couples to the axle bracket at the top of the vehicle axle, and the plurality of height adjusting panels are sandwiched between the axle and the axle bracket.

12. The tire shrapnel protection device of claim 11, wherein the bent bracket comprises a U-bolt.

13. The tire shrapnel protection device of claim 8, wherein the axle bracket comprises:

a first mounting member mounted to the tire fender;

a second mounting member mounted to the vehicle axle; and a plurality of bracing elements connecting the first mounting member to the second mounting member such that, a predetermined angle is maintained between the first mounting member to the second mounting member.

14. The tire shrapnel protection device of claim 8, wherein the tire fender is made from a four foot by eight foot sheet of material.

15. The tire shrapnel protection device of claim 8, wherein the tire fender comprises plate steel of at least one-sixteenth inch thickness.

16. A tire shrapnel protection device comprising:

a tire fender having a substantially continuous containment cavity; and means for coupling the tire fender to a vehicle, wherein, when the tire fender is coupled to a vehicle by the means for coupling, the containment cavity extends over at least a top and exterior face of an upper third of a diameter of a tire such that the containment cavity intercepts shrapnel from failure of the tire before it reaches a body of the vehicle;

wherein the tire fender comprises:

a tread cover having a width greater than a width of the tire and extending from a first edge to a second edge along a curvilinear path defined by an inner bounding diameter greater than the diameter of the tire;

a front panel releasably coupled to one or more tabs of the tread cover at a front perimeter thereof; and, a back panel coupled to the tread cover at a back perimeter, wherein the front panel and the back panel are each coupled to a corresponding face of the tread cover at the first edge and at the second edge such that, when the shrapnel impacts at least one of the first edge and the second edge, at least one of the front panel and the back panel apply a tensile force between the first edge and the second edge along a mechanical path having an effective diameter less than the diameter of the tire.

\* \* \* \* \*